Jan. 26, 1954    J. C. RHODES    2,667,584
STERILIZING APPARATUS FOR LIQUIDS
Filed Nov. 24, 1948    2 Sheets-Sheet 1
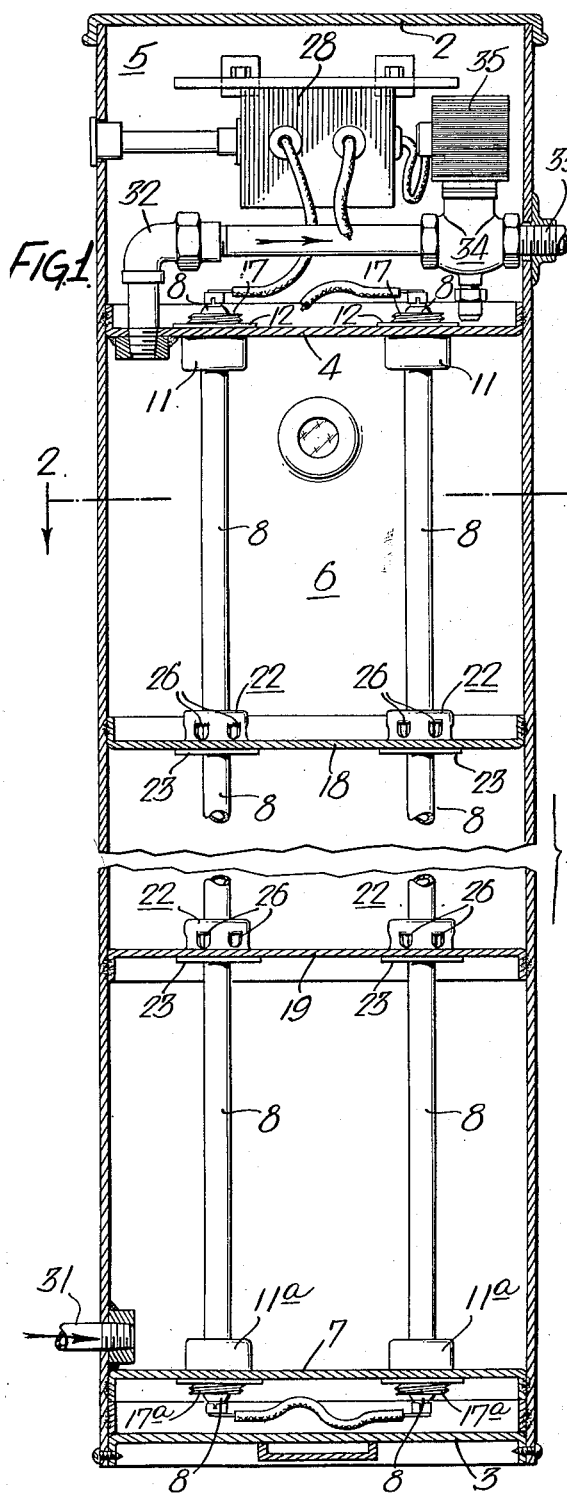
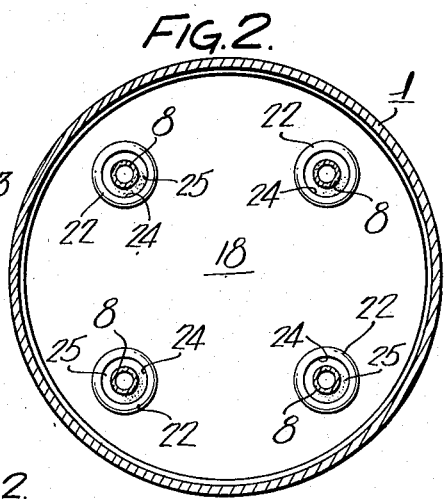
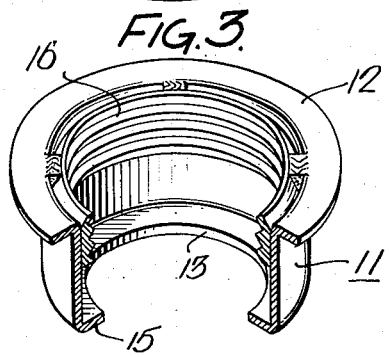
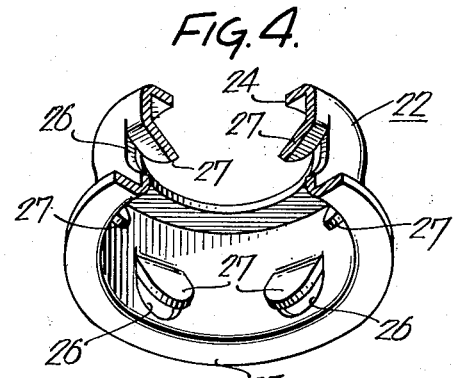

Jan. 26, 1954    J. C. RHODES    2,667,584
STERILIZING APPARATUS FOR LIQUIDS
Filed Nov. 24, 1948    2 Sheets-Sheet 2
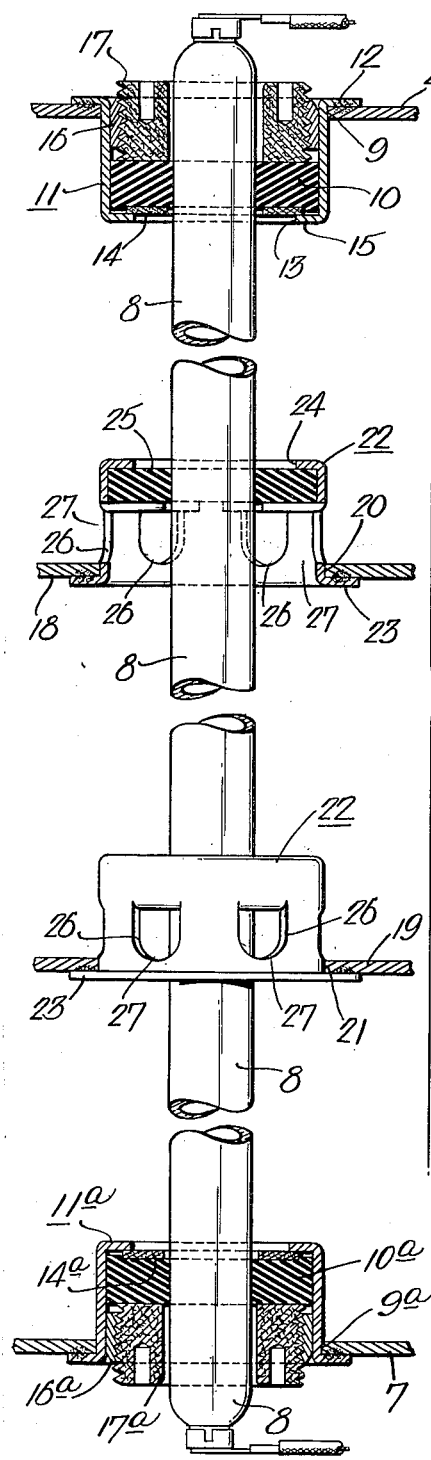
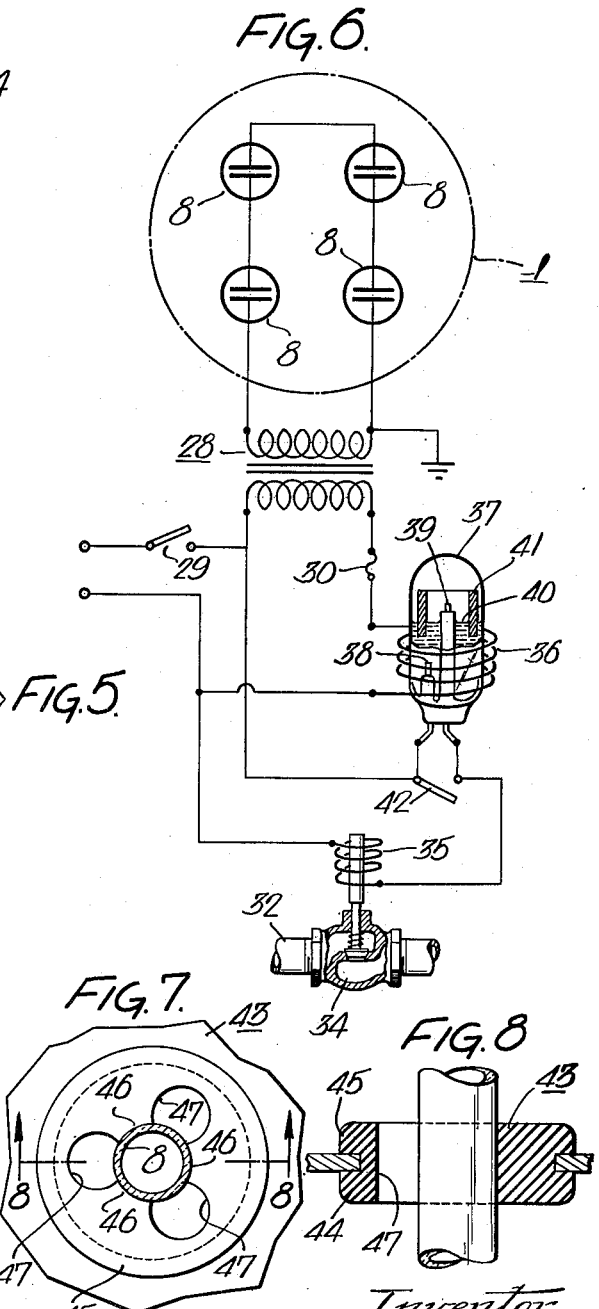
Inventor
John Cecil Rhodes
by his Attorneys
Howson &
Howson

UNITED STATES PATENT OFFICE 2,667,584

STERILIZING APPARATUS FOR LIQUIDS

John Cecil Rhodes, Jenkintown, Pa., assignor to Rhodes Research Corporation, Jenkintown, Pa., a corporation of Pennsylvania Application November 24, 1948, Serial No. 61,825

7 Claims. (Cl. 250—45)

This invention relates to new and useful improvements in sterilizing apparatus and more particularly to apparatus for sterilizing water—especially water intended for human consumption.

The major portion of the water consumed in the United States today comes from private wells and springs or like sources as distinguished from the public utility operated water supplies which are found in the larger urban areas and which for the most part are fit for human consumption. The purity of the water obtained from private wells and springs is a health problem of considerable magnitude and in the last few years the health departments of the various States have undertaken extensive educational programs to get owners and users of these private wells and springs to have the water tested at frequent intervals for the presence of germs, bacteria and the like. Actually, existing health records indicate that about 50% of the water issuing from such wells or springs is contaminated and not fit for human consumption.

With the foregoing in mind, the principal object of the present invention is to provide a sterilizing device for water and the like which may be connected in the water line between the well or spring and the outlets in a house or other building and which is operable automatically to sterilize the water as it flows through the line from the well or spring to the faucet or tap.

Another object of the invention is to provide a device of the character set forth which operates efficiently to completely sterilize water at a very high rate of flow.

Another object of the invention is to provide a device of the type described which avoids completely the use of chemicals and thereby eliminates the necessity for constant tests of the chemical content and degree of purification.

Another object of the invention is to provide a novel device as set forth which in operation affects neither the taste nor odor of the water and does not affect adversely the valuable minerals present in good water.

A further object of the present invention is to provide a device having the features and characteristics set forth which is operable automatically to shut off the flow of water through the device in the event of the failure of the tubes which generate the rays that destroy germs and bacteria in the water.

A still further object of the invention is to provide a sterilizing device as set forth wherein means is provided which may be operated in the event of failure of the tubes to enable unsterilized water to pass through the device until the tube or tubes can be replaced.

Still a further object of the present invention is to provide a sterilizing device having the characteristics and features set forth which is highly efficient and foolproof in use, is of relatively simplified and inexpensive construction and is economical to operate, maintain and service.

These and other objects of the invention, and the various features and details of the construction and operation thereof, are hereinafter fully set forth and described in reference to the accompanying drawings in which:

Fig. 1 is a vertical view diametrically through a water sterilizing device made in accordance with the present invention;

Fig. 2 is a sectional view taken on line 2—2, Figure 1;

Figs. 3 and 4, respectively, are enlarged sectional perspective views showing the construction and arrangement of the members utilized to support the ultra-violet sterilizing tubes in the device;

Fig. 5 is a detached sectional view showing one of the ultra-violet tubes and the manner in which the same is supported by the members shown in Figs. 3 and 4 of the drawings;

Fig. 6 is a diagram of the circuit for supplying electric current to the ultra-violet tubes, including the means which operates automatically to prevent the flow of water through the device in the event of failure or breakage of one or more of said tubes;

Fig. 7 is a fragmentary view in plan illustrating a modified form of tube support member; and Fig. 8 is a sectional view taken on line 8—8, Fig. 7.

Referring now more particularly to the drawings, in the embodiment of the invention illustrated reference numeral 1 designates generally a cylindrical tank or casing having top and bottom closures 2 and 3, respectively. Some distance beneath the top closure 2 there is a horizontal partition 4 which, in effect, subdivides the interior of the casing or tank 1 into an upper mechanism compartment 5 and a lower relatively larger tube compartment 6. In addition, there is disposed adjacent the bottom of the tube compartment 6 a horizontal partition 7 which, together with the aforesaid partition 4, constitute supports for the top and bottom ends of several ultra-violet tubes 8. The partitions have their peripheral edges secured to the inner wall of the casing 1 in fluid-tight relation.

In the illustrated embodiment of the invention, four ultra-violet tubes 8 are provided, and each of these has its top and bottom supported in suitable openings 9 and 9a, respectively, provided in the partition members 4 and 7. The upper ends of the ultra-violet tubes 8 project entirely through the openings 9 in the partition 4 so that the upper ends of the tubes 8 are exposed above the said partition 4, and the lower ends of the tubes project downwardly through the openings 9a in the partition 7, as shown.

With reference more particularly to Figs. 3 and 5 of the drawings, the upper end of each tube 8 is supported in its opening 9 in the partition 4 by means of an annular washer member 10 composed of rubber or other suitable nonporous resilient material. The washer 10 fits snugly within a cup-shaped member 11 which extends downwardly through the opening 9 in the partition 4 and at its upper edge has a laterally extending flange 12 that overlies and is welded to the surface partition 4 surrounding the opening 9 therein. As shown, the bottom of the cup member 11 has an opening 13 therein of appreciably greater diameter than the diameter of the tube 8 and the underside of said washer 10 is supported by an annular fibre washer 14 which in turn rests upon the in-turned bottom edge flange 15 of the cup member 11.

Secured internally of the vertical side wall portion of the cup member 11, for example, by welding, is an internally threaded sleeve 16. In order to provide a water-tight joint between the annular washer 10 and the tube 8 and between the washer 10 and the inner side walls of the cup 11, there is threaded into the sleeve 16 an annular compression member 17. The member 17 is adapted to be tightened against the upper surface of the washer 10 thereby compressing the same and expanding it laterally in respectively opposite direction so that its inner and outer surfaces engage the wall of the cup member 10 and the tube 8 with sufficient tightness to prevent the passage of water therebetween.

As shown in Fig. 5 of the drawings, the lower or bottom end of each tube 8 is supported in the openings 9a with respect to the partition 7 by an assembly comprising a washer 10a, cup 11a, washer 14a, sleeve 16a and compression member 17a, constructed and arranged in a manner identical to the previously described supports for the tube upper ends except that in the case of the lower ends of the tubes the assembly is inverted as illustrated.

At more or less equally spaced intervals vertically within the tube chamber 6 and between the partitions 4 and 7 suitable baffles or partitions 18 and 19 are provided which extend transversely within the casing 1 and have their flanged edges secured in fluid-tight relation to the interior surface of the tank 1, for example, by means of welding. Each of the tubes 8 passes through relatively larger openings 20 and 21, respectively, in said baffles 18 and 19 and is supported with respect to said baffles substantially centrally within said openings 20 and 21 by means of inverted cup-shaped members 22.

These inverted cup-shaped members 22 extend upwardly through the baffle openings 20 and 21, respectively, and are provided at their lower edges with a circumferential edge flange 23 which underlies and is welded to the baffle 18 or 19 as the case may be. The top of the inverted cup-shaped member 22 has an opening 24 therein of substantially larger diameter than the tube 8 and the latter is supported centrally with respect to the opening in the member 22 by means of an annular washer 25 of rubber or other suitable nonporous resilient material. The washer 25 fits tightly within the member 22 and snugly embraces the tube 8 so as to provide substantially a fluid-tight joint between the tube 8, the washer 25 and the latter and the interior wall of the cup member 22.

Formed in the side wall portion of the inverted cup-shaped members 22 above the respective baffles 18 and 19 are suitable openings or ports 26 arranged at spaced intervals circumferentially of the member 22. As shown in the drawings, these openings or ports 26 may be formed by pressing inwardly of the members 22 a plurality of tab or ear portions 27 which may be disposed horizontally against the underside of the washer 25 in the relation shown, for example, in Fig. 5 of the drawings.

As stated, the joints between the baffles 18 and 19 in the wall of the tank 1 and the joints between said baffles and the cup members 22 and the tubes 8 are fluid-tight so that the sole course by means of which water can pass upwardly through the tube chamber 6 and past the respective baffles 19 and 18 is for the water to flow upwardly into the cup members 22 and then laterally outward through the openings or ports 26 in the side walls thereof, for example, as indicated by the arrows in Fig. 5 of the drawings. This is important since it has been determined that in order properly to sterilize the water passing upwardly through the tube chamber 6 it is necessary that all of the water passing through the chamber 6 be brought into close proximity to the tubes 8 at least a plurality of times during passage through the device. Thus the described construction and arrangement of the support members 22 provides not only an effective and efficient support for the tubes 8 but also provides a construction whereby the water can pass the respective baffles 19 and 18 only by passing closely adjacent to the tubes 8.

With reference to Fig. 6 of the drawings, the several ultra-violet tubes 8 are connected in series and supplied with electricity from the secondary of a step-up transformer 28 which has its primary suitably connected, for example, to a source of 110 volt, 60 cycle, alternating current. The secondary circuit is grounded to the tank 1 as shown, and the primary circuit is provided with the usual main off-on switch 29 as well as a fuse 30. The ultra-violet tubes 8 are of the so-called cold cathode type having a maximum production of ultra-violet rays of about 2500 to 2700 angstrom units.

Water enters the tank 1 at the lower end thereof, just above the partition 7, through a pipe 31, and leaves the tube chamber 6 at the top thereof through the partition 4 by means of a pipe 32 which extends horizontally cross-wise of the mechanism chamber 5 and then passes exteriorly through the wall of the latter as indicated at 33. Connected in the pipe 32 is a valve 34 which is operated by a solenoid 35, and the construction and arrangement of said valve and solenoid is such that when the solenoid is energized the valve 34 will be open to permit the flow of water through the pipe 32 and outwardly of the tank 1.

Energization of the solenoid 35 is controlled by a mercury relay which comprises a coil 36 connected in the transformer primary circuit a sealed envelope 37 of glass or the like within said coil 36 and containing a pair of electrical terminals 38 and 39 arranged in relatively vertically spaced relation as shown. Also contained within the envelope 37 is a body of mercury 40 in which floats an annular element 41 of magnetic material. When the coil 36 of the mercury relay is not energized the surface of the mercury 40 in the envelope 37 is below the upper electrical terminal 39 and the ring of magnetic material 41 is floating in the body of mercury 40 in the general relation shown in Fig. 6 of the drawings.

In normal operation of the device and with the ultraviolet tubes 8 functioning properly, current passing through the relay coil 36 pulls the magnetic member 41 downwardly into the mercury with respect to Fig. 6 of the drawings thereby displacing sufficient mercury to raise the level thereof and bring it into contact with the upper terminal 39 thereby completing an electric circuit across the terminals 38 and 39 and causing energization of the solenoid 35 and opening of the valve 34.

In the event, however, that one of the ultraviolet tubes 8 should fail or burn out so that no current flows through the secondary circuit of the transformer 28, there will be a decrease in current in the primary circuit of the transformer, including the relay coil 36, sufficient to cause the magnetic member 41 to rise thereby lowering the level of the mercury 40 and breaking the contact between the terminals 38 and 39 with the result that the solenoid 35 is deenergized and the valve 34 closes to prevent unpurified water from continuing to flow from the device. In this event, if it is desired to draw contaminated water from the device pending replacement of the damaged tube or tubes, a suitable switch 42 is provided and arranged when closed to complete the circuit across the mercury relay thus energizing the solenoid 35 and opening the valve 34. Of course, any contaminated water drawn from the device under these circumstances should be boiled or otherwise sterilized prior to consumption. On the other hand, in the event of breakage of one of the tubes or other circumstance causing a short-circuit to the tank 1, the resulting current increase in the transformer primary circuit will be sufficient to blow the fuse 36 thereby likewise breaking the circuit to the solenoid 35 causing deenergization thereof and closure of the valve 34.

In Figs. 7 and 8 of the drawings there is illustrated a modified form of the support for the tubes 8 in the baffles 18 and 19. As shown, this support comprises a unitary grommet-like member 43 of rubber or similar material adapted to be inserted, for example, in one of the openings 20 or 21 in baffles 18 and 19. The member 43 is provided with relatively spaced circumferential flanges 44 and 45 which receive snugly and tightly therebetween the edge portion of a baffle surrounding a tube opening therein in the relation shown in Fig. 8. Formed centrally through the member 43 is an opening of irregular configuration including a coaxially disposed circular portion 46 for receiving and firmly supporting one of the tubes 8 and a plurality of radially disposed lobe portions 47 which surround the circular tube supporting portion 46 at equally spaced intervals. These lobe portions 47 constitute the sole openings for the passage of water from one side of a baffle to the other and it will be apparent by this construction that the water is required to pass in close proximity to the tubes as previously described.

From the foregoing description it will be observed that the present invention provides a novel automatically operable device for sterilizing water which is highly efficient and foolproof in operation and use, is economical to operate and requires a minimum of maintenance and service. The invention also provides a device as set forth which operates automatically to shut off the flow of water in the event of failure or short-circuiting of the device.

While a particular embodiment of the invention has been shown and described herein, it is not intended to limit the invention to the disclosure, and changes and modifications may be made therein and thereto within the scope of the following claims.

I claim:

1. In water sterilizing apparatus comprising a tank having spaced transverse partition members defining therebetween a tube compartment in said tank, a plurality of germicidal lamp tubes extending longitudinally in said compartment, at least one baffle member extending transversely of the tank within the tube compartment and having openings therein for the passage of said tubes, each of said openings being of greater diameter than the external diameter of the tube passing therethrough, fittings for supporting said tubes in said baffle openings and each comprising a tubular body portion having a greater internal diameter than the external diameter of the tube passing through said fitting and an external diameter corresponding substantially to the diameter of the baffle opening, said body portion extending substantially parallel to and in spaced relation from the surface of said tube to permit flow of water between said tube and said body portion and having one end secured in fluid tight relation to the portion of the baffle member surrounding said baffle opening, said body portion having its opposite end spaced a substantial distance from the plane of said baffle member, the wall of said body portion having lateral openings therethrough located between the baffle member and said opposite end of said body portion, said fittings each including an imperforate end wall extending inwardly from said opposite end of said body portion and embracing the surface of the tube in fluid tight relation, said imperforate end wall causing the water abruptly to change its direction of flow as it flows through said fitting from one side of said baffle member to the other side thereof thereby creating turbulence within said fittings and causing all particles of the water to pass closely adjacent said tubes to effect maximum sterilization, an inlet for water to said compartment at one end thereof, an outlet for water at the other end of said compartment, and means to supply an electric current to said germicidal tubes.

2. In water sterilizing apparatus as defined in claim 1 wherein the imperforate end wall of each fitting is composed of nonporous resilient material.

3. In water sterilizing apparatus as defined in claim 1 wherein each fitting comprise a cup-shaped member having an opening in the bottom thereof beyond the lateral openings in the body portion of said cup-shaped member and of substantially greater diameter than the diameter of the tube passing therethrough, and wherein the imperforate end wall comprises an annular washer having its inner edge in fluid tight relation with the tube and its outer edge in fluid tight relation with the inner wall of said cup-shaped member.

4. In water sterilizing apparatus as defined in claim 1 wherein each transverse partition member is provided with openings therein for the passage of the opposite ends of said germicidal lamp tubes, and wherein means are provided for supporting said tube ends in said partition openings in fluid-tight relation.

5. In water sterilizing apparatus as defined in claim 4 wherein the means for supporting the tube ends in said partition openings include non-porous, resilient, annular elements embracing said tube ends in fluid-tight relation.

6. In water sterilizing apparatus comprising a tank having spaced transverse partition members defining therebetween a tube compartment in said tank, a plurality of germicidal lamp tubes extending longitudinally in said compartment, at least one baffle member extending transversely of the tank within the tube compartment and having openings therein for the passage of said tubes, each of said openings being of greater diameter than the external diameter of the tube passing therethrough, fittings for supporting said tubes in said baffle openings and each comprising a tubular body portion having a greater internal diameter than the external diameter of the tube passing through said fitting and an external diameter corresponding substantially to the diameter of the baffle opening, said body portion extending substantially parallel to and in spaced relation from the surface of said tube to permit flow of water between said tube and said body portion and having one end secured in fluid-tight relation to the portion of the baffle member surrounding said baffle opening, said body portion having its opposite end spaced a substantial distance from the plane of said baffle member, the wall of said body portion having lateral openings therethrough located between the baffle member and said opposite end of said body portion, said fittings each including an imperforate end wall extending inwardly from said opposite end of said body portion and embracing the surface of the tube in fluid-tight relation, said imperforate end wall causing the water abruptly to change its direction of flow as it flows through said fitting from one side of said baffle member to the other side thereof thereby creating turbulence within said fittings and causing all particles of the water to pass closely adjacent said tubes to effect maximum sterilization, an inlet for water to said compartment at one end thereof, an outlet for water at the other end of said compartment, and means to supply an electric current to said germicidal tubes including a transformer having a secondary circuit in which said tubes are connected in series and a primary circuit, a valve in said water outlet, a solenoid to operate said valve connected in said primary circuit and arranged when energized in normal operation of the tubes to open said valve, and means connected in said primary circuit constructed and operable to break the circuit to deenergize the solenoid and close the valve upon failure of one of said tubes causing a decrease in the normal current in said primary circuit.

7. In water sterilizing apparatus as defined in claim 6 wherein the means connected in said primary circuit comprises a relay constructed and operable to break the circuit to deenergize the solenoid and close the valve upon failure of one of said tubes causing a decrease in the normal current in said primary circuit.

JOHN CECIL RHODES.

References Cited in the file of this patent

UNITED STATES PATENTS

| Number | Name | Date |
|---|---|---|
| 854,965 | Potter | May 28, 1907 |
| 1,208,830 | Pratt | Dec. 19, 1916 |
| 1,196,481 | Von Recklinhausen | Dec. 19, 1916 |
| 2,175,682 | Chafee | Oct. 10, 1939 |
| 2,253,657 | Smith | Aug. 26, 1941 |
| 2,338,388 | Whitman | Jan. 4, 1944 |
| 2,537,774 | Machinist | Jan. 9, 1951 |